UNITED STATES PATENT OFFICE
PTO – BOYERS, PA DUTY STATION

---

PAGE NOT AVAILABLE

PATENT NUMBER X5058 FOR THE ISSUE DATE 4/5/1828 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X5058 4-5-1828

Anthony Plantou.

Letters Patent, Issued 5th April 1828.

The schedule referred to in these Letters Patent and making part of the same containing a description in the words of the said Anthony Plantou, himself of his improvement in making terro-metallic teeth.

Till this improvement, a small or two small pieces of Platina were inserted into the teeth at the moment of their fabrication which much weakened the teeth, and very often caused them to split in the baking or in the soldering and was often came out or separated itself from the teeth when in use. All these great disadvantages are obviated by not inserting any platina into the teeth at the moment of their fabrication, and instead of it, to make with a small wire a hole through the teeth, which after the baking is stopped or filled up with silver, gold or platina wire and gold solder melted on both extremities of it; this adds more to the strength of the teeth and they are lighter by not using platina. Teeth made so & of a good material never will break nor separate themselves from the hold, nor the hold from the plate, which brings the art of dentistry to its perfection for artificial teeth. Then so as to secure to myself the advantages which are a result to society from this improvement & to prevent the common practice of infringing patent rights, I also specify that porcelain teeth may be well secured to a plate if the small hole is made to the teeth, without passing entirely through, and a wire of silver or gold, after the baking is introduced into the hole and gold solder melted into it, which makes a perfect hold. If at the time of the fabrication of the teeth the said holes are made a little larger at the bottom than at the top, this mode would be still neater, but perhaps not as secure as the other.

X5058

I must say that these important improvements have been suggested to me by necessity which is truly the mother of invention; Platina being at this time so dear, so scarce, & in fact, not being able to obtain any, I have made the experiments & have made teeth without it; & simply soldered them to a gold plate, that I have no doubt that experience will prove that this new mode has a great superiority over the ancient.

Witnesses.

Joseph [illegible] — A. Plantou

William [illegible]

Ent. 1176 — (456 words)